United States Patent
Bang et al.

(10) Patent No.: US 9,619,197 B2
(45) Date of Patent: Apr. 11, 2017

(54) DISPLAY APPARATUS AND CONTROL METHOD THEREOF

(71) Applicant: SAMSUNG ELECTRONICS CO., LTD., Suwon-si (KR)

(72) Inventors: Min-Hyok Bang, Anyang-si (KR); Sang-bae Park, Cheongju-si (KR); Keum-ok Lee, Suwon-si (KR); Dong-jin Lee, Suwon-si (KR); Jung-kun Lee, Seoul (KR); Jae-hoon Jeong, Suwon-si (KR); Kyung-sun Cho, Seoul (KR); Seong-seol Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/644,303

(22) Filed: Mar. 11, 2015

(65) Prior Publication Data
US 2015/0262331 A1   Sep. 17, 2015

(30) Foreign Application Priority Data

Mar. 11, 2014 (KR) .................. 10-2014-0028440

(51) Int. Cl.
*G06F 3/14* (2006.01)

(52) U.S. Cl.
CPC .......... *G06F 3/1431* (2013.01); *G06F 3/1446* (2013.01); *G06F 3/1423* (2013.01); *G09G 2310/0232* (2013.01); *G09G 2340/04* (2013.01); *G09G 2340/0442* (2013.01)

(58) Field of Classification Search
None
See application file for complete search history.

(56) References Cited

U.S. PATENT DOCUMENTS

| | | | |
|---|---|---|---|
| 2005/0093893 A1* | 5/2005 | Senior | G06T 3/0012 345/660 |
| 2005/0168630 A1 | 8/2005 | Yamada et al. | |
| 2010/0060547 A1* | 3/2010 | Bloebaum | G06F 1/1624 345/1.3 |
| 2015/0029229 A1* | 1/2015 | Voutsas | G06F 1/1652 345/661 |

* cited by examiner

*Primary Examiner* — Joseph Haley
(74) *Attorney, Agent, or Firm* — Sughrue Mion, PLLC

(57) ABSTRACT

Disclosed are a display apparatus and a control method thereof, in which displays are moved to display an image on a visible screen formed by a plurality of images. The display apparatus includes: a first display configured to display a first screen; a second display configured to display a second screen; and a controller configured to control an area of one visible screen formed by the first and second screens by changing at least one area of the first screen and the second screen, determine a first portion and a second portion of an image to be displayed so that the area of the visible screen corresponds to an area of the image, and controls the image to be respectively displayed on the first screen and the second screen.

22 Claims, 13 Drawing Sheets

DISPLAY APPARATUS AND CONTROL METHOD THEREOF

CROSS-REFERENCE TO RELATED APPLICATION

This application claims priority from Korean Patent Application No. 10-2014-0028440, filed on Mar. 11, 2014 in the Korean Intellectual Property Office, the disclosure of which is incorporated herein by reference.

BACKGROUND

Field

Apparatuses and methods consistent with the exemplary embodiments relate to a display apparatus and a control method thereof, and more particularly to a display apparatus and a control method thereof, in which one image can be displayed through a plurality of displays.

Description of the Related Art

There has recently been increased demand for a display apparatus which maximizes the size and quality of a displayed image so that it looks real. To maximize the size and quality of the displayed image, the display apparatus must have a large screen.

However, using a display apparatus of a related art it is impossible to increase or decrease the prescribed area. That is, it is impossible to adjust the screen size of the display apparatus as desired by a user.

Further, an image has been produced to have different aspect ratios. Due to different aspect ratios of the image, a given screen area of the display apparatus is not fully utilized to display the image. As shown in FIG. 1, if an image A having an aspect ratio of 1.85:1 is displayed on the display apparatus having an aspect ratio of 4:3, black screens B are formed in the display apparatus. Also, because the screen area of the display apparatus is not fully utilized, it is inconvenient that the image displayed is small in size.

Therefore, there is required a display apparatus in which an overlapped display is moved to provide a visible screen having the same aspect ratio as an image, thereby displaying images while automatically optimizing the displays in accordance with the aspect ratios of the images.

SUMMARY

One or more exemplary embodiments may provide a display apparatus and a control method thereof, in which a display is movable so that an area of a visible screen can be matched with an area of an image to be displayed, thereby displaying one image on the visible screen formed by the moved display.

According to an aspect of another exemplary embodiment, there is provided a display apparatus including: a first display configured to display a first screen; a second display configured to display a second screen; and a controller configured to control an area of one visible screen formed by the first and second screens to be changed by changing at least one area of the first screen of the first display and the second screen of the second display, determine a first portion and a second portion of an image to be displayed so that the area of the visible screen can correspond to an area of the image, and controls the first portion and the second portion to be respectively displayed on the first screen and the second screen.

The area may include an aspect ratio.

The display apparatus may further include a driver configured to change at least one area of the first screen and the second screen, wherein the controller controls the driver to change at least one area of the first screen and the second screen so that the area of the visible screen can correspond to the area of the image.

The area of the visible screen may include the area of the first screen, and the area of the second screen not overlapped with the area of the first screen.

The display apparatus may further include a power supply configured to supply electric power to the display, wherein the controller controls the area of the second screen of the second display, not overlapped with the area of the first screen, to be not supplied with electric power.

The controller may determine a changing direction and a changing distance of at least one area of the first screen and the second screen by analyzing the aspect ratio of the image, and change at least one area of the first screen and the second screen based on the determined changing direction and distance.

The controller may change the area of the second screen to be matched with one between horizontal and vertical widths of the area of the first screen.

The controller may match a horizontal or vertical width of the image with one of the horizontal or vertical width of the area of the first screen, and control the image to be displayed on the area of the visible screen while maintaining the aspect ratio of the image if the area of the second screen is changed.

The controller may change the area of the second screen based on the horizontal or vertical width determined so that the visible screen can have the maximum area.

The controller may change the area of the second screen based on at least one of horizontal and vertical widths of a preset area of the visible screen.

The first display and the second display may include at least one of a transparent panel and a flexible panel.

The display apparatus may further include: an image processor configured to process the image; and a plurality of storages configured to store the images corresponding to the first and second portions, wherein the controller controls respective images of the determined first and second portions to be processed and stored in the respective storages.

According to an aspect of another exemplary embodiment, there is provided a method of controlling a display apparatus, the method including: changing at least one area of a first screen of a first display and a second screen of a second display so that an area of one visible screen formed by the first and second screens can be changed; determining a first portion and a second portion of an image to be displayed so that the area of the visible screen can correspond to an area of the image; and controlling the first portion and the second portion to be respectively displayed on the first screen and the second screen.

The area may include an aspect ratio.

The changing the area may comprise changing at least one area of the first screen and the second screen so that the area of the visible screen can correspond to the area of the image.

The area of the visible screen may include the area of the first screen, and the area of the second screen not overlapped with the area of the first screen.

The controlling the first portion and the second portion to be respectively displayed on the first screen and the second screen may include controlling the area of the second screen of the second display, which is not overlapping with the area of the first screen, so as not to be supplied with electric power.

The changing the area may include determining a changing direction and a changing distance of at least one area of the first screen and the second screen by analyzing the aspect ratio of the image, and changing at least one area of the first screen and the second screen based on the determined changing direction and distance.

The changing the area may include changing the area of the second screen to be matched with one between a horizontal width and a vertical width of the area of the first screen.

The controlling the first portion and the second portion to be respectively displayed on the first screen and the second screen may include: matching a horizontal or vertical width of the image with one of the horizontal or vertical width of the area of the first screen; and controlling the image to be displayed on the area of the visible screen while maintaining the aspect ratio of the image if the area of the second screen is changed.

The changing the area may include changing the area of the second screen based on the horizontal or vertical width determined so that the visible screen can have the maximum area.

The changing the area may include changing the area of the second screen based on at least one of horizontal and vertical widths of a preset area of the visible screen.

The controlling the first portion and the second portion to be respectively displayed on the first screen and the second screen may include: controlling respective images of the determined first and second portions to be processed and stored in respective storages.

BRIEF DESCRIPTION OF THE DRAWINGS

The above and/or other aspects will become apparent and more readily appreciated from the following descriptions of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The present disclosure may be achieved in various forms and not limited to the following embodiments. For convenience of description, parts not directly related to the present disclosure are omitted, and like numerals refer to like elements throughout.

Figure 2:
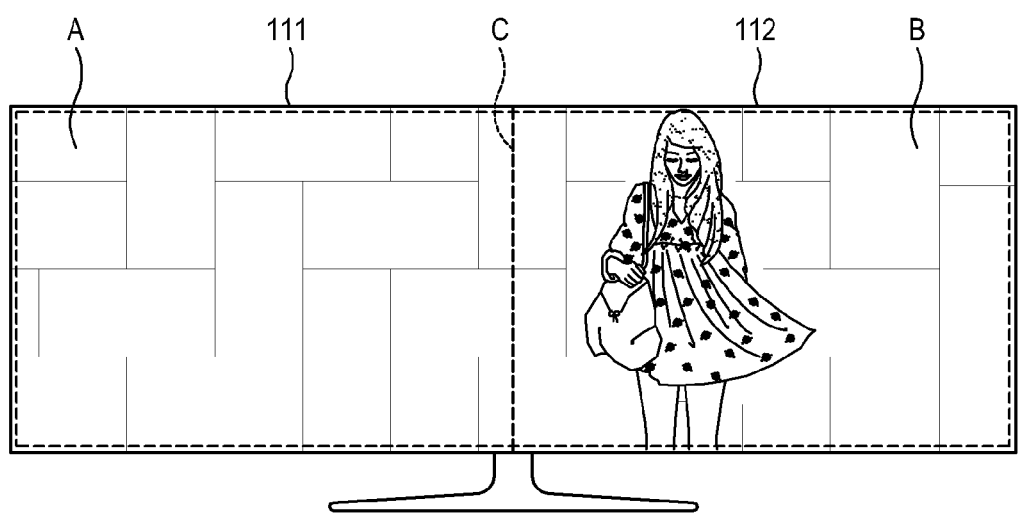
FIG. 2 is a view showing an example of an outer appearance of a display apparatus according to an embodiment.

FIG. 2 is a view showing an example of an outer appearance of a display apparatus 1 according to an embodiment. According to an embodiment, the display apparatus 1 may be achieved by a notebook computer, a smart television (TV), a monitor, a user terminal, etc. Also, any display apparatus capable of displaying an image may be applied as the display apparatus 1.

FIG. 2 illustrates that the notebook computer 1 displays one image through a dual monitor 110, in which a first portion A of a first screen A of a left first display 111 and a second portion B of a second screen B of a right second display 112 are divided by a center line C. Here, the second display 112 is moved and positioned without any portion overlapped with the first display 111. Therefore, the first screen A and the first portion A have the same area, and the second screen B and the second portion B have the same area. However, if there is a portion where the first display 111 and the second display 112 are overlapped, at least one of the areas of the first screen A and the first portion A and the areas of the second screen B and the second portion B may have different areas. Also, the areas A and B of the visible screen are the screen areas A and B of the display apparatus 1, which can be seen by a user, that is, the screen areas A and B formed by the first display 111 and the second display 112 of the display apparatus 1 are moved and shown to a user. That is, the areas A and B of the visible screen includes the area A of the first screen A and the area B of the second screen, the area B not overlapped with the area A of the first screen. The foregoing areas will be described in more detail with reference to FIGS. 8 and 9.

Before displaying an image having a different aspect ratio on the notebook computer 1, display 111 is displaying a screen corresponding to a user's command. Then, if the display receives a command for displaying an image with a different aspect ratio, the second display 112 of the notebook computer 1 is moved by a required distance so that the aspect ratio of the visible screen A and B formed by both the first and second displays 111 and 112 is equal to the aspect ratio of the image. Therefore, as shown in FIG. 2, the image is not displayed on one display 111 having a different aspect ratio from the image, but the image is divided into a plurality of images to be respectively displayed as one image through the different displays 111 and 112 forming the visible screen A and B, in which the first portion A of the first screen A and the second portion B of the second screen B of the displays 111 and 112 are formed to have the same aspect ratio as the image.

FIG. 2 illustrates that the image is displayed by two displays 111 and 112, but the number of displays 110 is not limited to two, and may be increased.

Figure 3:
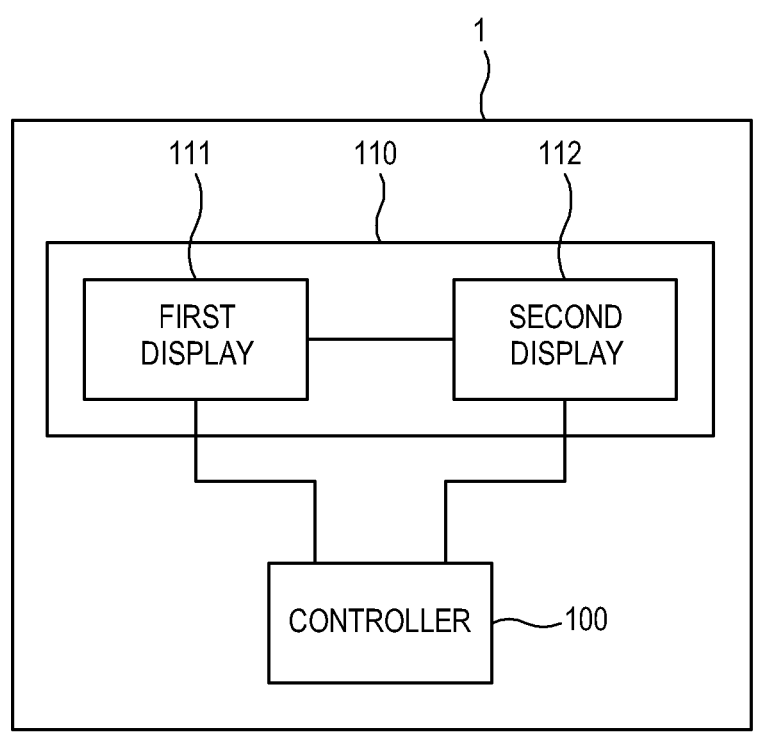
FIG. 3 is a block diagram of the display apparatus according to an embodiment.

FIG. 3 is a block diagram of the display apparatus 1 according to an embodiment. According to an embodiment, the display apparatus 1 may include the display 110 including the first display 111 and the second display 112, and a controller 100.

Figure 4:
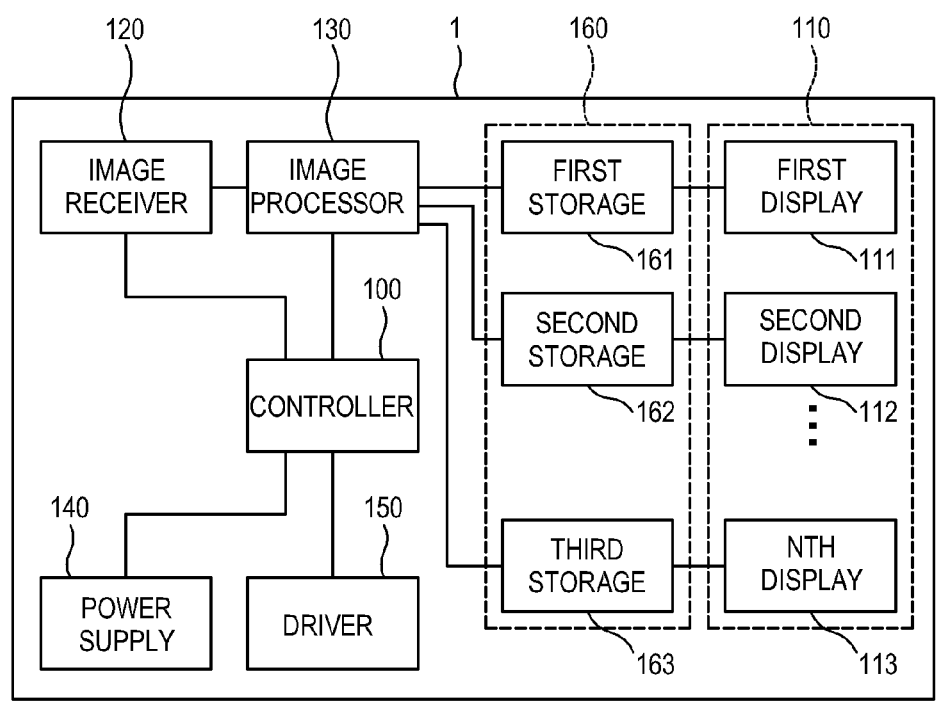
FIG. 4 is a block diagram of the display apparatus according to an exemplary embodiment.

The display 110 can display an image based on an image signal output from an image processor (130, see FIG. 4). The display 110 may include various types of display such as liquid crystal, plasma, a light-emitting diode, an organic light-emitting diode, a surface-conduction electron-emitter, a carbon nano-tube, a nano-crystal, etc., without any limitation.

The display 110 may include an additional element in accordance with its types. For example, if the display 110 is a liquid crystal type, the display 110 may include a liquid crystal display panel (not shown), a backlight unit (not shown) for emitting light, and a panel driving substrate (not shown) for driving the panel (not shown).

The display 110 displays an image based on the image signal processed by the image processor (130, see FIG. 4). The display 110 includes an LCD, a PDP, an OLED, or the like without limiting the type of displaying an image. In these respective cases, the display 110 may include an LCD panel, a PDP panel, an OLED panel or the like.

The display 110 may display an image and a color calibration feature. The display 110 may include a display panel to display an image thereon, and a panel driver to process an input image signal to be displayed as an image on the display panel. The image signal received from an external input source through the interface may undergo decoding, deinterlacing, scaling or the like imaging processes and be displayed on the display 110.

The display 110 may include the first display 111 for displaying a first screen, and the second display 112 for displaying a second screen. Using the controller, the area of at least one area between the first screen of the first display 111, and the second screen of the second display 112, may be changed so as to change the area of one visible screen formed by the first and second screens.

The display 110 may be achieved by a transparent panel, and may also be achieved by a flexible panel. The display 110 may include the transparent panel and the flexible panel, but is not limited thereto.

The controller 100 may determine the first portion and the second portion for the image so that the area of the visible screen can correspond to the area of the image to be displayed, and control the first portion and the second portion to be respectively displayed on the first screen and the second screen.

Figure 1:
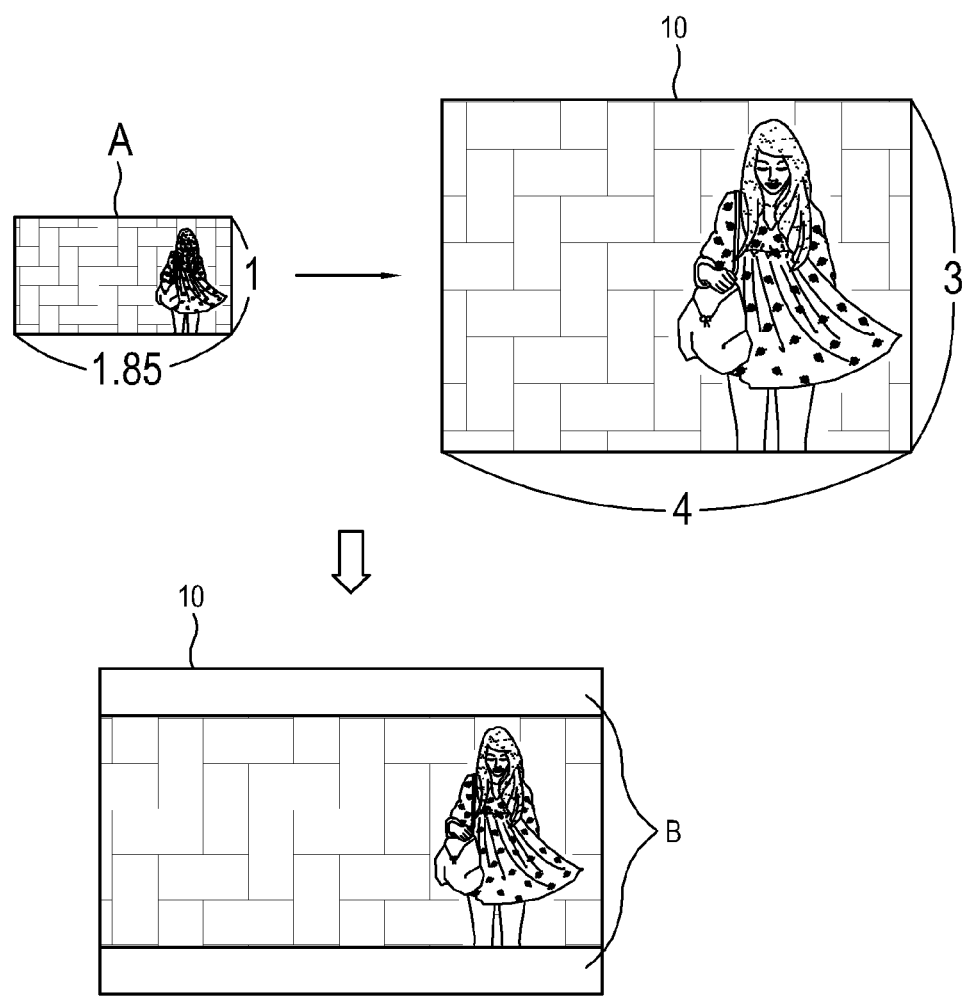
FIG. 1 is a view showing an example where an image is displayed in a display apparatus related to an embodiment.

FIG. 4 is a block diagram of the display apparatus 1 according to an exemplary embodiment. In this exemplary embodiment, the display apparatus 1 may further be configured to include an image receiver 120, an image processor 130, a power supply 140, a driver 150 and a storage 160 in addition to the elements of FIG. 1.

The image receiver 120 may receive an image signal/image data through a wire or wirelessly, and transmit it to the image processor 130. The image receiver 120 may receive a TV broadcasting signal or a similar broadcasting signal from a broadcasting signal transmitter (not shown) as an image signal; an image signal from a digital versatile disc (DVD) player, a Blu-ray disc (BD) player or the like imaging device; an image signal from a personal computer (PC); an image signal from a smart phone, a smart pad or the like mobile device; an image signal through Internet or the like network; video contents stored in a universal serial bus (USB) storage medium or the like storage medium as an image signal. Alternatively, the image signal may be not received through the image receiver 120, and stored and provided from the storage 160. The image receiver 120 may be provided in various forms according to the formats of the received image signal and types of the display apparatus 1. For example, the image receiver 120 may receive a radio frequency (RF) signal, and the image signal based on composite video, component video, super video, SCART, high definition multimedia interface (HDMI), display port, unified display interface (UDI), wireless HD standards, etc. If the image signal is the broadcasting signal, the image receiver 120 may include a tuner tuned to a broadcasting signal according to channels.

There is no limit to the kind of image processing performed in the image processor 130. For example, the imaging process may include de-multiplexing for dividing a predetermined signal into signals according to characteristics, decoding corresponding to a format of a predetermined signal, de-interlacing for converting an image signal of an interlace type into a progressive type, noise reduction for improving image quality, detail enhancement, frame refresh rate conversion, etc., and the image processor 130 may include a decoder (not shown) for decoding a source image corresponding to an image format of an encoded source image, and a frame buffer (not shown) for storing the decoded source image in units of frames.

The image processor 130 may be achieved by a system on chip (SOC) where such various functions are integrated, or an image processing board (not shown) where individual elements for independently performing each process are mounted on a printed circuit board, and be embedded in the display apparatus 1.

The image processor 130 performs various imaging processes with regard to a broadcasting signal including an image signal received from a receiver (not shown), and a source image including an image signal received from an image source (not shown). The image processor 130 outputs such a processed image signal to the display apparatus, so that the processed source image can be displayed on the display apparatus 1.

The power supply 140 supplies electric power to internal components of the display apparatus 1 under control of the controller. Under control of the controller 100, the power supply 140 may not supply the electric power so that a partial area of the display 110 cannot display the image.

Figure 10:
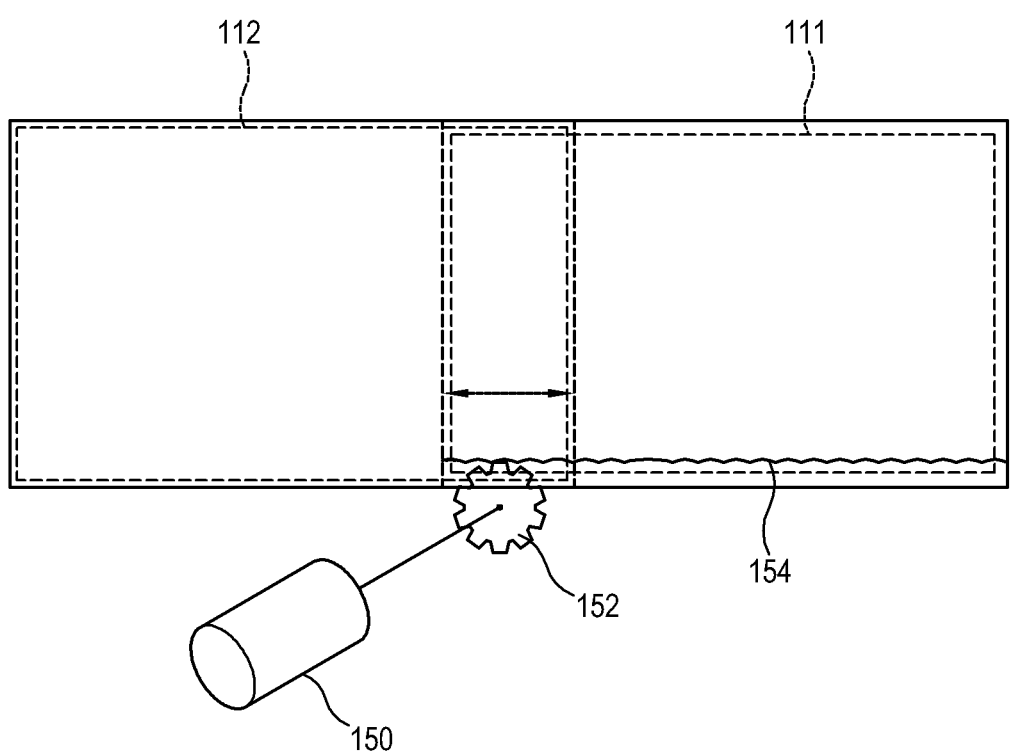
FIG. 10 is a view showing an example where a second display is manually moved by operating a driver of a display apparatus according to another embodiment.

The driver 150 may generate a driving force to move and transform the first display 111 and the second display 112 under control of the controller 100. Referring to FIG. 10, the driver 150 may be achieved by a motor configured such that a rotation of the motor can rotate a circular saw-toothed wheel 152 engaged with a plurality of saw-toothed grooves 154 formed in the first display 111 and the second display 112, thereby moving the first display 111 and the second display 112. There is no limit to such a method of moving the display 110 as shown in FIG. 10 since it is nothing but an example. In this embodiment, the first display 111 and the second display 112 are movable to form the visible screen, but any operation and connection of the display 110 using the driver 150 are possible.

The storage 160 may be a nonvolatile memory (i.e., a writable read only memory (ROM)) so that data can remain even though the display apparatus 1 is powered off, and a user's change of the data is reflected thereto. That is, the storage 160 may be achieved by a flash Memory or one of an erasable and programmable read only memory (EPROM) and an electrically erasable programmable read only memory (EEPROM). The storage 160 may be provided corresponding to the number of displays 110 so as to store images processed by the image processor 130 to be displayed on the plurality of displays 110.

The area of the visible screen and the area of the image have aspect ratios.

The area of the visible screen may include the area of the first screen, and the screen of the second screen that is not overlapped with the area of the first screen. The visible screen may include the area where the image is displayed through the plurality of displays 110.

The controller 100 controls the driver 150 to change at least one area between the first and second screens so that the area of the visible screen corresponds to the area of the image. Here, the change in the area may refer to the visible screen that is formed by moving the display in accordance with the shapes of the display, or that the visible screen is formed by changing the shape of the display.

The controller 100 may be configured to not supply power to the area of the second screen of the second display 112 which is overlapped with the area of the first screen.

The controller 100 analyzes the aspect ratio of the image, determines a changing direction and a changing distance of at least one area of the first screen and the second screen, and changes the at least one area of the first screen and the second screen based on the determined changing direction and distance. For example, if an image to be displayed has an aspect ratio of 1.85:1, the first display 111 has an aspect ratio of 4:1, movement is needed in a horizontal direction, and a distance is calculated corresponding to the aspect ratio. The controller 100 controls the driver 150 to move the second display 112 by a calculated movement, transformation directions, and transformation distances. Here, the calculated movement and transformation distances of the display 110 may be varied depending on the driving types of the driver 150. The driver 150 may be provided in every display 110, or one driver 150 may be used to simultaneously move the first display 111 and the second display 112, thereby forming the visible screen. Thus, the movement distance of the display 110 may be calculated corresponding to a moving method.

The controller 100 may change the area of the second screen to be equal to one of the horizontal and vertical widths of the area of the first screen. For instance, the second display 112 may be horizontally moved corresponding to the aspect ratio of the image to be displayed while the vertical widths are matched with each other. Such movement of the second display 112 causes the visible screen to have a rectangular shape.

Figure 8:
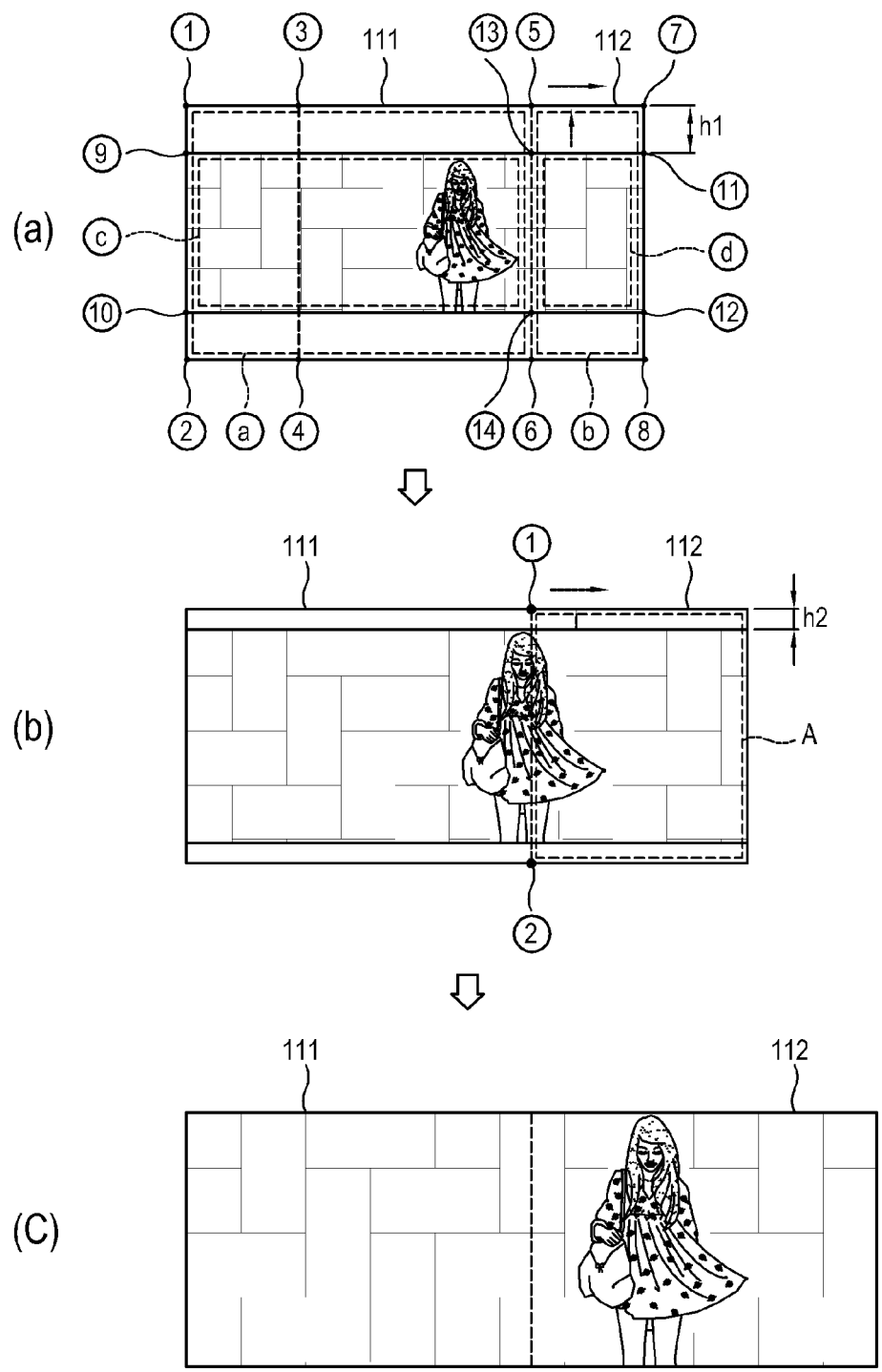
FIG. 8 is a view showing an example where a second display is automatically moved to display an image in a display apparatus according to another embodiment.

The controller 100 matches the horizontal or vertical width of the image with one of the horizontal and vertical widths of the area of the first screen, and controls the image to be displayed on the area of the visible screen while maintaining the aspect ratio of the image if the area of the second screen is changed. FIG. 8 is an exemplary embodiment of a view showing an example where the second display 112 is automatically moved to display an image in a display apparatus according to another embodiment. As shown in FIG. 8, in the case where the second display 112 is horizontally moved to correspond to the aspect ratio of the image, (a) shows that the left side of the image matches with the left side of the first display 111 with respect to the vertical width. Although the vertical widths of the image and the visible screen are matched with each other, the image does not correspond to the visible screen (i.e., a rectangular area formed by connecting four points ①, ⑦, ⑧ and ②), and therefore upper and lower black screens each having a vertical width of h1 are formed in the display 110. If the second display 112 is horizontally moved in this state, (b) shows that the vertical width of the image has to be enlarged so as to maintain the aspect ratio of the image since the vertical width of the image is matched with the vertical width of the visible screen (i.e., the rectangular area formed by connecting four points ①, ⑦, ⑧ and ②). Therefore, the upper and lower black screens each having the vertical width of h1 are reduced in the display 110 to each have a vertical width of h2, thereby enlarging the image. (c) shows that the second display 112 is further horizontally moved and stopped when the aspect ratio of the visible screen (i.e., the rectangular area formed by connecting four points ①, ⑦, ⑧ and ②)) is equal to the aspect ratio of the image.

Below, the first portion ⓒ of the first screen ⓐ of the first display 111 and the second portion ⓓ of the second screen ⓑ of the second display 112 will be described.

In FIG. 8, (a) shows that only the second display 112 is moved while the first display 111 is stationary and placed at the back, and therefore the first display 111 and the first screen ⓐ are the same and have the rectangular area formed by connecting four points ①, ⑤, ⑥ and ②. Further, the first portion ⓒ, in which an image is displayed, has a rectangular area formed by connecting four points ⑨, ⑬, ⑭ and ⑩. The other areas obtained by subtracting the first portion ⓒ from the first screen ⓐ are the black screens. The area of the visible screen (i.e., the rectangular area formed by connecting four points ①, ⑦, ⑧ and ②)) is formed by the first and second display that can be shown to a user, that is, the area formed by connecting four points ①, ⑦, ⑧ and ② in (a) of FIG. 8.

Further, the second display 112 and the second screen ⓑ have the same area formed by connecting four points ③, ⑦, ⑧ and ④. However, the second portion ⓓ, that is, the area ⓓ of the second display 112 where the image is displayed is a rectangular area formed by connecting four points ⑬, ⑪, ⑫ and ⑭. The area obtained by subtracting the second portion ⓓ from the second screen ⓑ is the black screen. The areas corresponding to the black screens of the first display 111 and the second display 112 may be not supplied with electric power.

Figure 11:
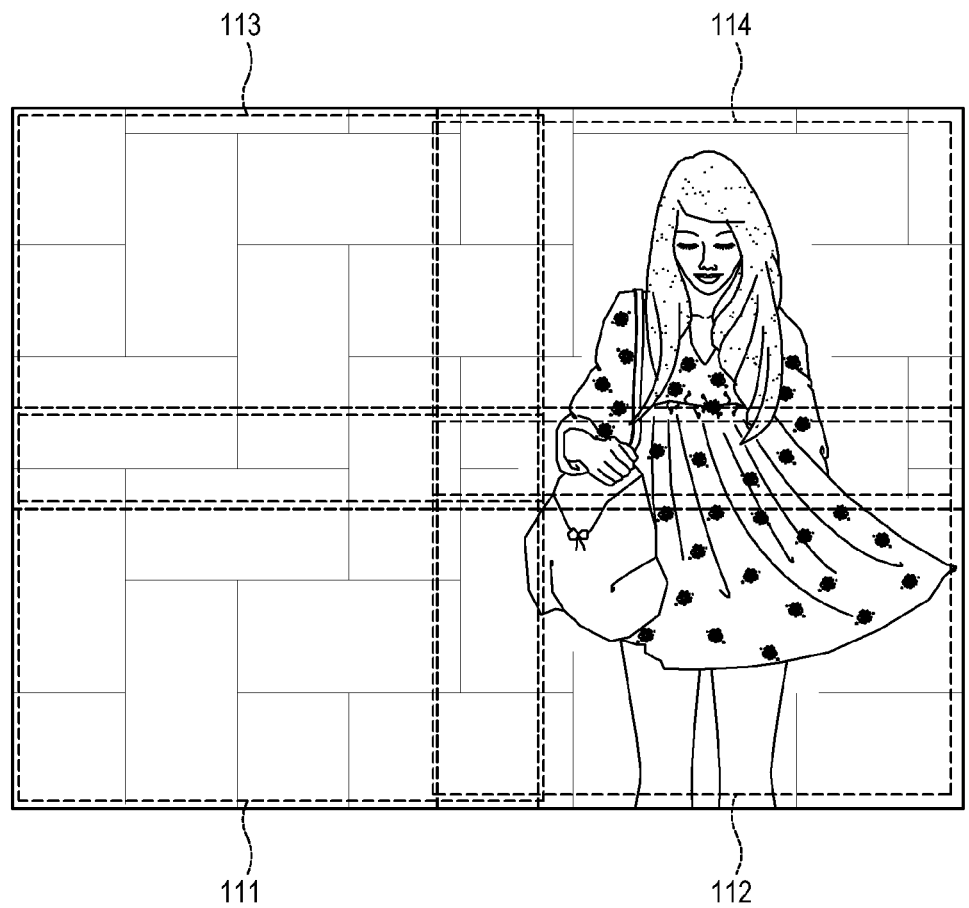
FIG. 11 is a view showing an example where four displays are moved to display a visible screen in a display apparatus according to another embodiment.

The controller 100 determines the horizontal or vertical width to be adjusted so that the visible screen can have the maximum area, thereby changing the area of the second screen. The controller 100 analyzes the aspect ratio of the image to be displayed, and calculates the moving distance for the second display 112 so that the visible screen can have the maximum area through the second display 112. As shown in FIG. 11, if there are three movable second displays 112, one second display 112 is horizontally moved, and two second displays 112 are vertically moved, thereby forming a visible screen having the maximum area while corresponding to the aspect ratio of the image. According to an exemplary embodiment, a user may use a portable beam projector to view an image while outdoors or while camping. However, an image projected from the beam projector which is displayed on a white wall or white cloth may be deteriorated in quality as compared with that displayed on the display apparatus 1. If it is easy to carry the display apparatus 1 while outdoors or while camping, an image can be displayed with display apparatus 1 with better quality. The greater the amount the second displays 112 are extendable from the movable display apparatus 1 according to the exemplary embodiment, the larger the image is displayed.

The controller 100 can change the area of the second screen with respect to at least one between horizontal and vertical widths of a preset visible screen.

The first display 111 and the second display 112 may include at least one of a transparent panel and a flexible panel.

The controller 100 processes images of the determined first and second portions and stores the processed images in their own respective storages 160.

As the second display 112 which is overlapped with the first display 111 is moved, the resulting visible screen is enlarged. The controller 100 may determine how far the second display 112 is moved, and controls only the second area of the second display 112 corresponding to the visible screen to display the image. For example, the second display 112 is moved corresponding to the aspect ratio of the image to be displayed, and the visible screen viewed by a user is 20% of the second display 112. Although the entire screen area of the second display 112 may display an image of the portion overlapped with the first display 112, the controller 100 may control the image to be displayed on only the screen area of the second display corresponding to the visible screen in order to reduce power consumption of the display apparatus 1 as much as possible.

For example, as shown in (b) of FIG. 8, if the second display 112 is moved in the horizontal direction, the area A from the area formed by connecting upper and lower points ①  and ② corresponding to the horizontally moved distance to one side of the horizontal direction, is regarded as the screen area where the image is displayed in the second display 112.

Figure 5:
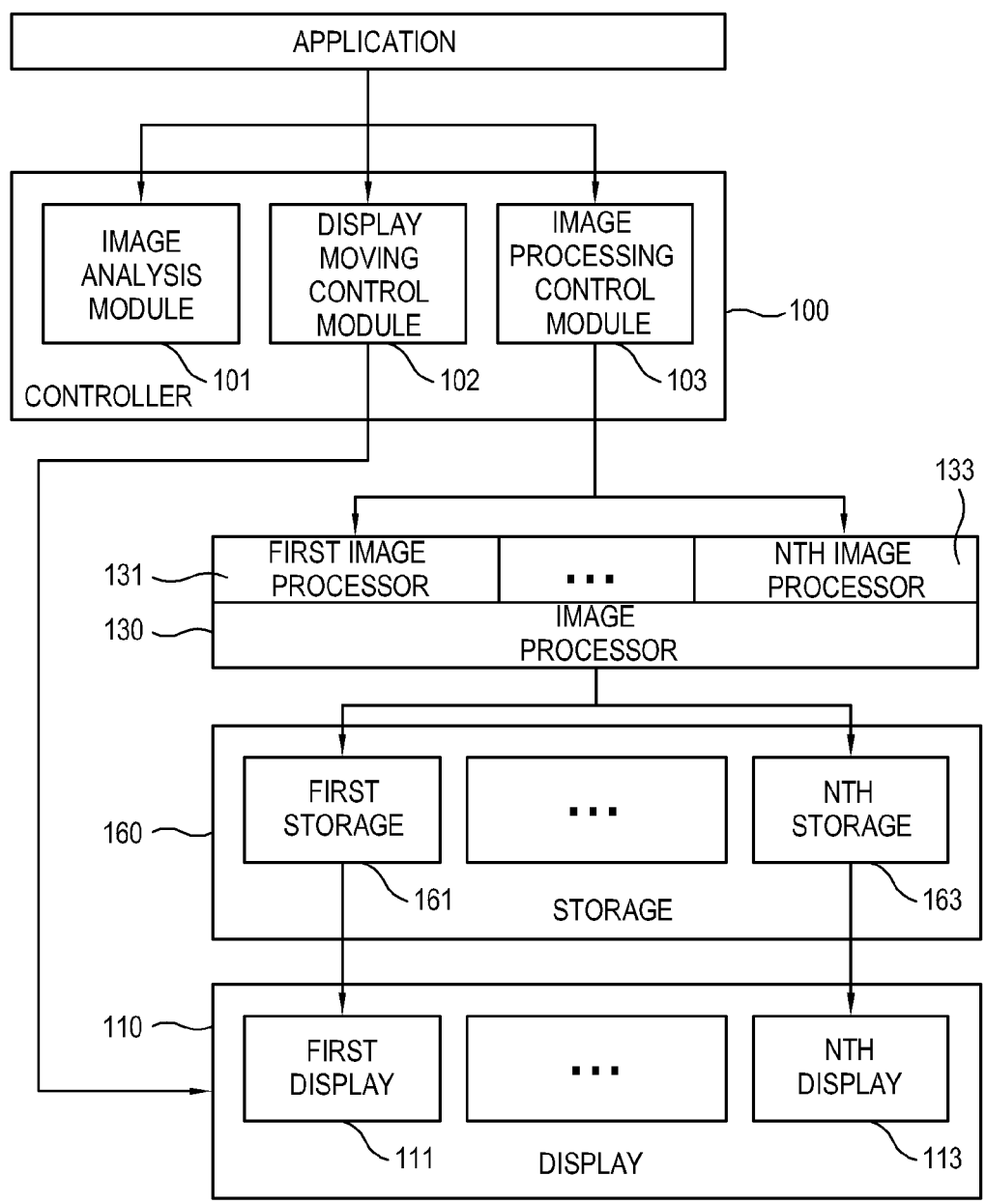
FIG. 5 is a view showing an example where an image is divided and displayed by elements of the display apparatus according to an exemplary embodiment.

FIG. 5 is a view showing an example where an image is divided and displayed by elements of the display apparatus 1 according to an exemplary embodiment;

As shown in FIG. 5, the controller 100 may include an image analysis module 101 capable of using an application, a display moving control module 102, and an image processing control module 103.

The image analysis module 101 analyzes an image to be displayed.

In accordance with the aspect ratio of the analyzed image, the display moving control module 102 moves the second display 112 to adjust the area of the visible screen.

The image processing control module 103 sends the image processor 130 the images to be displayed on the first display 111 and the second display 112.

The image processor 130 processes the images to be respectively stored in the storages 160 and transmits them to the first display 111 and the second display 112 to display the images.

Figure 6:
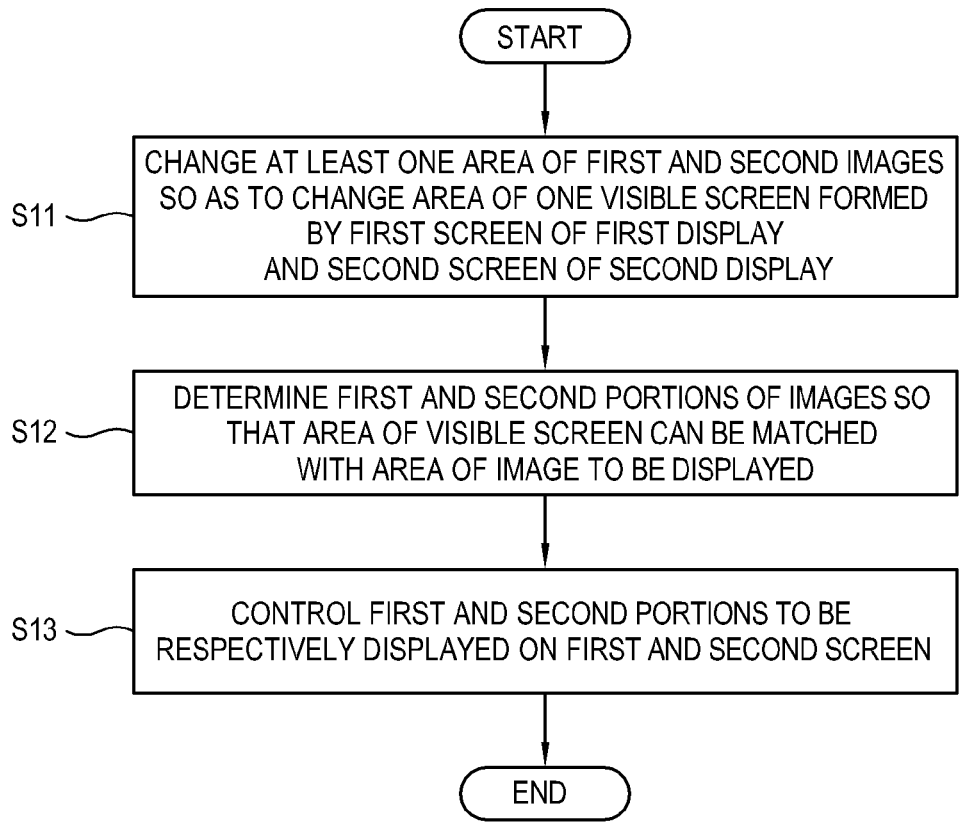
FIG. 6 is a control flowchart showing operations of the display apparatus according to an embodiment.

FIG. 6 is a control flowchart showing operations of the display apparatus 1 according to an embodiment.

The controller 100 changes at least one area of the first screen and the second screen so as to change the area of one visible screen formed by the first screen of the first display 111 and the second screen of the second display 112 (S11).

The controller 100 determines the first portion and the second portion of the image so that the area of the visible screen can correspond to the area of the image to be displayed (S12).

The controller 100 controls the first portion and the second portion to be displayed on the first screen and the second screen, respectively (S13).

Figure 7:
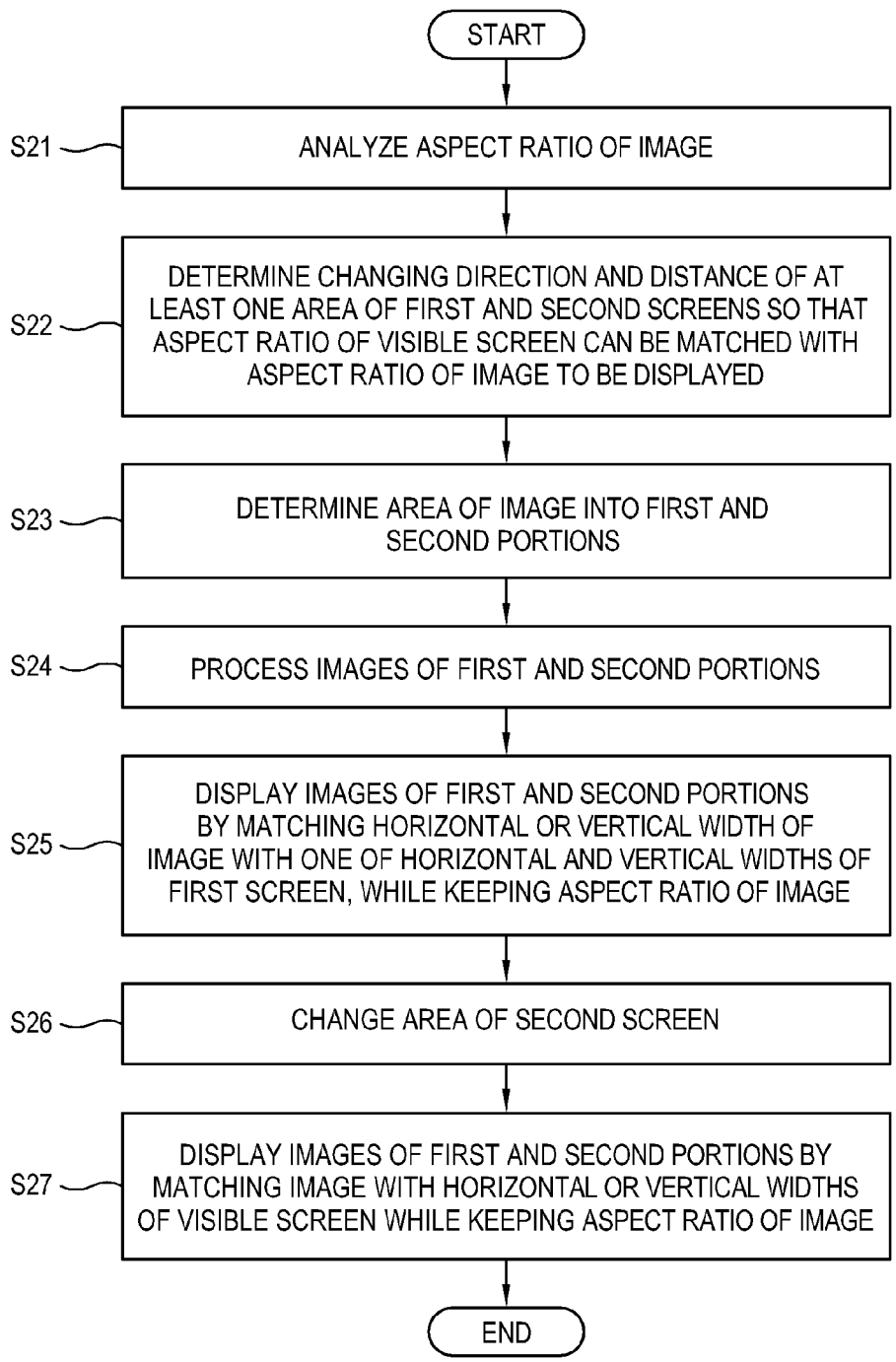
FIG. 7 is a control flowchart showing operations of the display apparatus according to an exemplary embodiment.

FIG. 7 is a control flowchart showing operations of the display apparatus 1 according to an exemplary embodiment.

The controller 100 analyzes an aspect ratio of an image (S21).

The controller 100 determines the changing direction and the changing distance of at least one area between the first screen and the second screen so that the aspect ratio of the visible screen can correspond to the aspect ratio of the image to be displayed (S22).

The controller 100 divides and determines the area of the image into the first portion and the second portion to be displayed on the visible screen (S23).

The controller 100 sends the image processor 130 the divided first and second portions of the image, the image processor processes the divided image (S24).

The controller 100 controls the images of the first portion and the second portion to be displayed so that one of the horizontal and vertical widths of the area of the first screen corresponds to the horizontal or vertical width of the image (S25).

The controller 100 changes the area of the second screen (S26).

The controller 100 matches the image with the horizontal or vertical width of the visible screen while maintaining the aspect ratio of the image, thereby displaying the images of the first portion and the second portion (S27).

Figure 9:
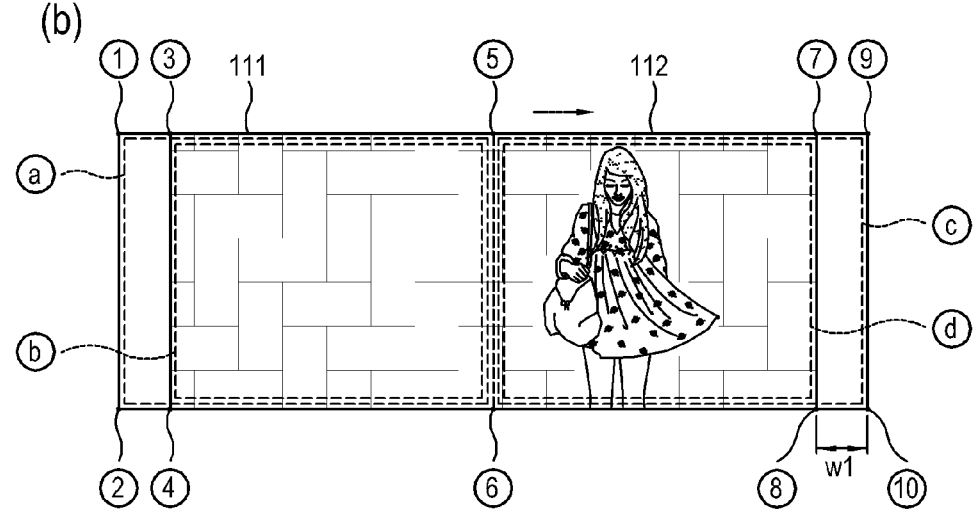
FIG. 9 is a view showing an example where a second display is manually moved to display an image in a display apparatus according to another embodiment.

FIG. 9 is a view showing an example where a second display 112 is manually moved to display an image in a display apparatus 1 according to another embodiment.

A user may manually move the second display 112 to change the area of the visible screen. (a) shows that a user directly moves the second display 112 horizontally. When the second display 112 is horizontally moved to correspond to the aspect ratio of the image, (a) shows that the left side of the image is matched with the left side of the first display 111 and the right side of the image is matched with the right side of the second display 112. The image and the visible screen are matched with respect to the horizontal width, but the vertical width of the image is not matched with the vertical width of the visible screen. Thus, upper and lower black screens each having a vertical width of h1 are formed on the display 110.

A user may manually move the second display 112 in the same manner that the second display 112 is automatically moved as shown in FIG. 8. However, in the case of manually moving the second display 112, it is impossible to precisely determine the moving and stop positions for the second display 112 in accordance with the aspect ratio of the image. In FIG. 9, (b) shows that the second display 112 is excessively moved. If the second display 112 is excessively moved, black screens are displayed as large as w1 at the left side of the first display 111 and the right side of the second display 112 in order to maintain the aspect ratio of the image. Here, the first portion ⓒ of the first screen ⓐ of the first display 111 and the second portion ⓓ of the second screen ⓑ of the second display 112 will be described.

In FIG. 9, the first display 111 and the first screen ⓐ are the same and have a rectangular area formed by connecting four points ①, ⑤, ⑥ and ②. Further, the first portion ⓒ, in which an image is displayed, has a rectangular area formed by connecting four points ③, ⑤, ⑥ and ④. The other areas obtained by subtracting the first portion ⓒ from the first screen ⓐ are the black screens.

Further, the second display 112 and the second screen ⓑ have the same area formed by connecting four points ⑤, ⑨, ⑩ and ⑥. However, the second portion ⓓ, that is the area of the second display 112 in which the image is displayed, is formed by connecting four points ⑤, ⑦, ⑧ and ⑥. The other areas obtained by subtracting the second portion ⓓ from the second screen ⓑ are the black screens. The areas of the black screens of the first display 111 and the second display 112 may be not supplied with electric power.

Figure 12:
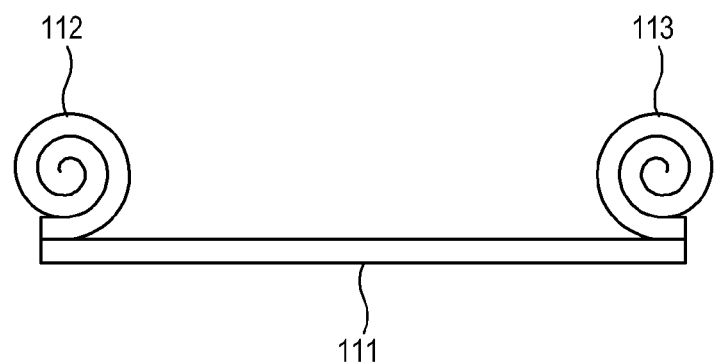
FIGS. 12 and 13 are views showing examples where flexible panels are used in a display apparatus according to another embodiment.
Figure 12:
Figure 12:
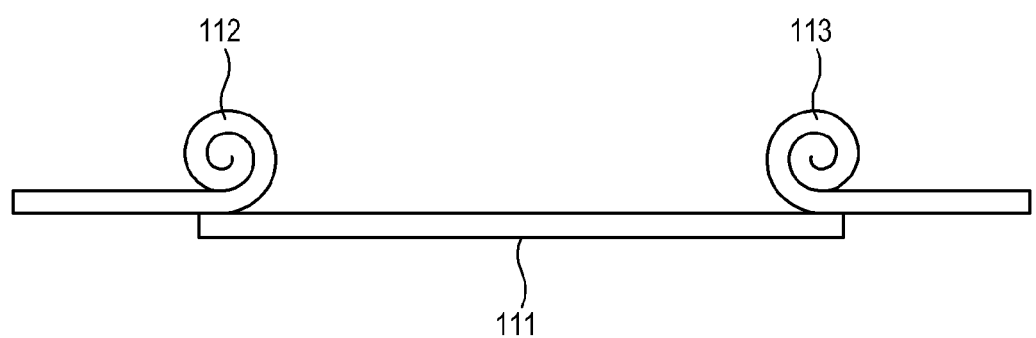
Figure 13:
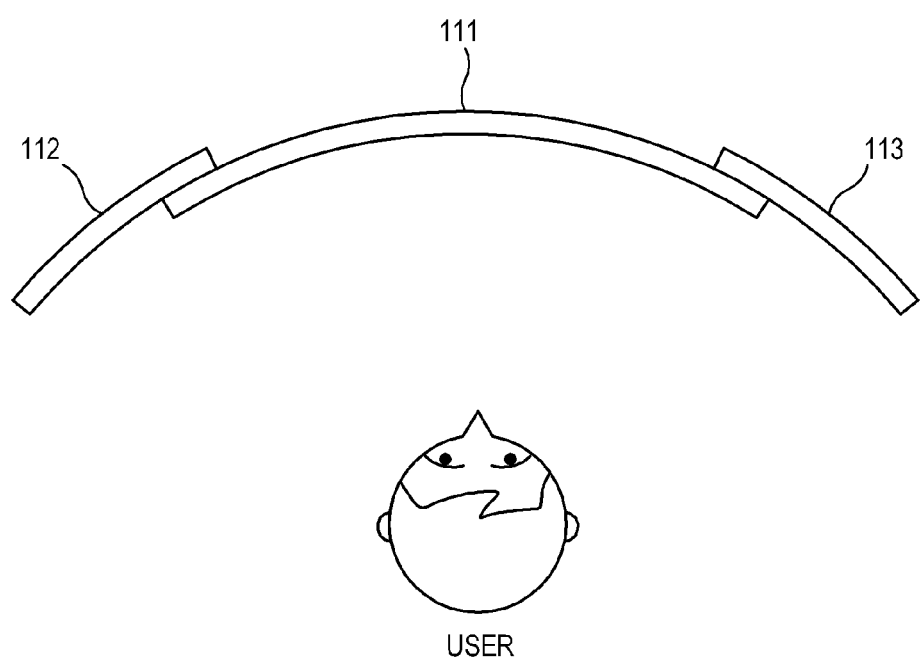

FIGS. 12 and 13 are views showing examples where flexible panels are used in a display apparatus 1 according to another embodiment.

FIG. 12 illustrates that the second display 112 is provided as the flexible panel at the back of the first display 111. If the second display 112 is controlled to move when the aspect ratio of the image to be displayed is different from the aspect ratio of the visible screen, the second display 112 is moved so that the second display 112 rolled up like a scroll on the back of the first display 111 can be unrolled to form the visible screen. In this case, a rail for holding the position of the second display 112 is provided so that the visible screen can have a stable shape with regard to the second display 112. Also, as shown therein, the second displays 112, i.e., the flexible panels are provided at opposite sides of the first display 111, and it is therefore possible to make a larger visible screen like a movie theater.

In FIG. 13, the first display 111 and the second display 112 are arranged to have a curved shape. Thus, the second display 112 is moved keeping its curved shape with respect to a user. The first display 111 and the second display 112 are provided as the flexible panels, but not limited thereto. Alternatively, the first and second displays may be provided as hard panels having a curved shape.

With the foregoing display apparatus 1, a user determines the first and second portions of the image so that the area of the visible screen formed by moving the second display 112 can be matched with the area of the image to be displayed even though the image has various aspect ratios, and thus views one image displayed on the screen areas of the respective displays 110.

According to an embodiment, the display is moved so that the area of the visible screen can be matched with the area of the image to be displayed, thereby extending the area of the visible screen.

Also, the visible screen can have the same aspect ratio as the image to be displayed, thereby providing a user with the image having higher quality.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A display apparatus comprising:
   a first display configured to have a first screen;
   a second display configured to have a second screen;
   a driver configured to change an area of one visible screen formed by the first and second screens by moving at least one of the first display and the second display; and
   a controller configured to:
     analyze an aspect ratio of an image to be displayed;
     determine a movement value for the moving of the at least one of the first display and the second display based on the analyzed aspect ratio of the image to be displayed;
     control the driver to change the area of the visible screen corresponding to the image to be displayed by said moving of the at least one of the first display and the second display by the determined movement value,
     determine a first portion and a second portion of the image to be displayed according to the change of the area of the visible screen, and
     control the first portion and the second portion to be respectively displayed on the first screen and the second screen.

2. The display apparatus according to claim 1, wherein the area is defined by the aspect ratio.

3. The display apparatus according to claim 1, wherein the controller controls the driver to change at least one area of the first screen and the second screen so that the area of the visible screen corresponds to an area of the image.

4. The display apparatus according to claim 1, wherein the area of the visible screen comprises the area of the first screen, and the area of the second screen not overlapped with the area of the first screen.

5. The display apparatus according to claim 1, further comprising a power supply configured to supply electric power to the display,
   wherein the controller controls the area of the second screen of the second display, the area of the second screen of the second display not overlapped with the area of the first screen, to be not supplied with electric power.

6. The display apparatus according to claim 1, wherein the controller determines the movement value by determining a changing direction and a changing distance of at least one area of the first screen and the second screen by analyzing the aspect ratio of the image, and changes said at least one area of the first screen and the second screen based on the determined changing direction and the determining changing distance.

7. The display apparatus according to claim 6, wherein the controller changes the area of the second screen to be matched with an area between a horizontal and a vertical width of the area of the first screen.

8. The display apparatus according to claim 1, wherein the controller matches a horizontal or vertical width of the image with one of a horizontal or a vertical width of the area of the first screen, and controls the image to be displayed on the area of the visible screen while maintaining the aspect ratio of the image if the area of the second screen is changed.

9. The display apparatus according to claim 1, wherein the controller changes the area of the second screen based on a horizontal or a vertical width determined so that the visible screen has a maximum area.

10. The display apparatus according to claim 1, wherein the controller changes the area of the second screen based on at least one of a horizontal and a vertical width of a preset area of the visible screen.

11. A method of controlling a display apparatus, the method comprising:
   analyzing an aspect ratio of an image to be displayed;
   determining a movement value for the moving of the a t least one of the first display and the second display based on the analyzed aspect of the image to be displayed;
   changing at least one area of a visible screen formed by a first screen of a first display and a second screen of a second display by moving the at least one of the first display and the second display by the determined movement value;
   determining a first portion and a second portion of an image to be displayed according to the change of the area of the visible screen; and controlling the first portion and the second portion to be respectively displayed on the first screen and the second screen.

12. The method according to claim 11, wherein the area is defined by the aspect ratio.

13. The method according to claim 11, wherein the changing the area comprises changing at least one area of the first screen and the second screen so that the area of the visible screen corresponds to an area of the image.

14. The method according to claim 11, wherein the area of the visible screen comprises the area of the first screen, and the area of the second screen which is not overlapped with the area of the first screen.

15. The method according to claim 11, wherein the controlling the first portion and the second portion to be respectively displayed on the first screen and the second screen comprises controlling the area of the second screen of the second display, the area of the second screen of the second display not overlapped with the area of the first screen, to have no electric power supplied thereto.

16. The method according to claim 11, wherein the determining the movement value comprises determining a changing direction and a changing distance of at least one area of the first screen and the second screen by analyzing the aspect ratio of the image, and changing said at least one area of the first screen and the second screen based on the determined changing direction and the determined changing distance.

17. The method according to claim 16, wherein the changing the area comprises changing the area of the second screen so as to be matched with an area between a horizontal and a vertical width of the area of the first screen.

18. The method according to claim 11, wherein the controlling the first portion and the second portion to be respectively displayed on the first screen and the second screen comprises:

matching a horizontal or a vertical width of the image with one of the horizontal, or the vertical width of the area of the first screen; and controlling the image to be displayed on the area of the visible screen while maintaining the aspect ratio of the image if the area of the second screen is changed.

19. The method according to claim 11, wherein the changing the area comprises changing the area of the second screen based on a horizontal or a vertical width determined so that the visible screen has a maximum area.

20. The method according to claim 11, wherein the changing the area comprises changing the area of the second screen based on at least one of a horizontal and a vertical width of a preset area of the visible screen.

21. The display apparatus according to claim 1, wherein the second display is a flexible display, and is provided with a plurality of rails so that a resulting visible screen has a stable shape, wherein the second display has a portion not visible and rolled up like a scroll when not used.

22. The display apparatus according to claim 1, wherein the first and the second display have a predetermined curvature, the first and second display panels overlap each other and the second display panel may be slid along the curvature of the first display panel in order to extend a viewing region of the display apparatus.

* * * * *